United States Patent
Hadjinikitas et al.

(10) Patent No.: US 7,024,556 B1
(45) Date of Patent: Apr. 4, 2006

(54) DISTRIBUTED SYSTEM AUTHENTICATION

(75) Inventors: Smaragda Hadjinikitas, Somerville, MA (US); Kenneth J. Blanc, Natick, MA (US); Jeffrey R. Young, Upton, MA (US)

(73) Assignee: 3Com Corporation, Marlborough, MA (US)

( * ) Notice: Subject to any disclaimer, the term of this patent is extended or adjusted under 35 U.S.C. 154(b) by 806 days.

(21) Appl. No.: 09/585,747

(22) Filed: Jun. 2, 2000

(51) Int. Cl.
*H04L 9/00* (2006.01)

(52) U.S. Cl. .......................... 713/168; 713/155; 726/8; 709/225; 709/227; 709/229

(58) Field of Classification Search ................ 709/217, 709/219, 225–227, 229; 713/155, 168, 200–202
See application file for complete search history.

(56) References Cited

U.S. PATENT DOCUMENTS

| | | | | |
|---|---|---|---|---|
| 6,092,196 A | * | 7/2000 | Reiche | 713/200 |
| 6,158,010 A | * | 12/2000 | Moriconi et al. | 713/201 |
| 6,226,752 B1 | * | 5/2001 | Gupta et al. | 713/201 |
| 6,421,768 B1 | * | 7/2002 | Purpura | 711/164 |
| 6,463,474 B1 | * | 10/2002 | Fuh et al. | 709/225 |
| 6,490,624 B1 | * | 12/2002 | Sampson et al. | 709/227 |
| 6,578,076 B1 | * | 6/2003 | Putzolu | 709/223 |
| 6,584,505 B1 | * | 6/2003 | Howard et al. | 709/225 |
| 6,629,082 B1 | * | 9/2003 | Hambrecht et al. | 705/37 |

* cited by examiner

*Primary Examiner*—Gilberto Barrón, Jr.
*Assistant Examiner*—Minh Dinh
(74) *Attorney, Agent, or Firm*—Weingarten, Schurgin, Gagnebin & Lebovici LLP

(57) ABSTRACT

In a technique for authenticating a user submitting a service request from a client to a server, a service agent on the server receives the service request and submits an authentication request to a manager agent. If the user is successfully authenticated, the manager agent transmits a message to the service agent including user authentication information and stores a time-out value establishing a predetermined time period. The service agent stores the user authentication information and shares it with a distributed application which provides the requested service to the user. The manager agent determines whether the predetermined time period has been exceeded before another service request is received at the service agent, and if not then the service agent attempts to authenticate the user using the stored authentication information. Otherwise, the service agent submits another authentication request to the manager agent to authenticate the user.

13 Claims, 4 Drawing Sheets

DISTRIBUTED SYSTEM AUTHENTICATION

CROSS REFERENCE TO RELATED APPLICATIONS

N/A

STATEMENT REGARDING FEDERALLY SPONSORED RESEARCH OR DEVELOPMENT

N/A

BACKGROUND OF THE INVENTION

The present invention relates to systems and techniques for authenticating users submitting requests from client computers for services/resources provided by server computers executing distributed applications.

In a typical computer network configuration, client computers interconnected by the computer network transmit user requests to access services/resources provided by server computers connected to the network. Such server computers typically include data processing agents, which execute applications for processing the user requests and providing the requested services/resources to the client computers. These applications may be executed on a single data processing agent to provide at least one service/resource to the client computers. Alternatively, these applications may be distributed such that portions of the distributed application are executed on respective data processing agents included in the server computer. As a result, each respective data processing agent may be used for providing specific services/resources to the client computers.

One drawback of server computers, whether they execute distributed or non-distributed applications, is that they typically have no knowledge about the user's right to access requested services/resources. This can be problematic because applications executing on server computers often provide different services/resources depending upon the user's level of access privileges.

For example, a user of a client computer with a particular level of access privileges may or may not have access to, e.g., specific files, directories, databases, web pages, and/or other computer services/resources provided by the application. It is therefore desirable to authenticate users submitting requests from client computers to ensure that they have the requisite levels of access privileges for accessing the requested files, directories, databases, web pages, and/or other computer services/resources. In this way, unauthorized users can be prevented from accessing restricted services/resources on the computer network, and the security of the computer network can be maintained.

One technique for authenticating users includes receiving a user request from a client computer at a server computer for a service/resource provided by an application resident on the server computer; and, in response to that request, transmitting a message from the server computer to the client computer informing the client computer of what it must do to authenticate the user. For example, that message might inform the client computer that in order to authenticate the user it must provide a valid USERNAME/PASSWORD combination. In response to that message, the user enters the required USERNAME/PASSWORD combination at the client computer. Another user request is then received at the server computer from the client computer including the entered USERNAME/PASSWORD combination. In response to that request, the USERNAME is located in, e.g., a stored access control list; the PASSWORD corresponding to the USERNAME is verified; and, if the USERNAME/PASSWORD combination is found valid, a stored level of access privileges is retrieved for that user. Finally, the application executing on the server computer provides the user of the client computer with the requested services/resources according to that user's level of access privileges.

The above-described technique of authenticating users can be implemented on a server computer with a single data processing agent executing a non-distributed application that requires knowledge of the user's access privilege level. However, this technique has drawbacks when implemented on a server computer with a plurality of data processing agents executing a distributed application because it has no mechanism for providing the user's access privilege level to the application executing on the plurality of agents.

It would therefore be desirable to have a system and technique for authenticating users submitting requests from client computers to a server computer executing a distributed application. It would also be desirable to have such systems and techniques for authenticating users that minimize the overall time required for performing user authentication.

BRIEF SUMMARY OF THE INVENTION

In accordance with the present invention, a method and apparatus are disclosed for authenticating a user submitting a service request from a client computer to a server computer executing a distributed application on a plurality of data processing agents. Such user authentication is accomplished by providing a centralized mechanism that all data processing agents of the server can utilize to authenticate a potential user.

In one embodiment, a first data processing agent included in the server receives a service request from a potential user, and submits an authentication request to a second data processing agent included in the server to authenticate the user. The second data processing agent attempts to authenticate the user, and transmits a message to the first data processing agent including information indicative of whether the user is successfully authenticated. If the user is successfully authenticated, then the first data processing agent shares that information with the distributed application executing thereon, which provides the requested service to the user. In the foregoing manner, the second data processing agent serves as the centralized mechanism that the first data processing agent and all of the remaining data processing agents included in the server can utilize to authenticate potential users.

In a second embodiment, the first data processing agent included in the server receives a first service request from the user, and submits an authentication request to the second data processing agent to authenticate the user. The second data processing agent attempts to authenticate the user; and, if the user is successfully authenticated, stores a time-out value indicative of a predetermined time period for that user. Next, the second data processing agent determines whether the predetermined time period is exceeded starting from a time of receipt of the first request. In the event that the predetermined time period is exceeded without receiving a second service request from the user, the server requires the user to be re-authenticated at the second data processing agent upon receipt of the second service request. In the foregoing manner, the second data processing agent restricts the amount of time that the user can remain idle before the server requires re-authentication of that user.

In a third embodiment, the first data processing agent receives a service request from the user, and submits an authentication request to the second data processing agent to authenticate the user. Next, the second data processing agent attempts to authenticate the user. In the event that the user is successfully authenticated, the second data processing agent transmits valid user authentication information to the first data processing agent, which locally stores that information. Next, the first data processing agent receives another service request from the user, and attempts to authenticate the user using the stored user authentication information. If the user is successfully authenticated, then the first data processing agent shares that information with the distributed application executing thereon, which provides the requested service to the user. In the foregoing manner, the first data processing agent can authenticate the user without having to submit an authentication request to the second data processing agent.

BRIEF DESCRIPTION OF THE SEVERAL VIEWS OF THE DRAWINGS

The invention will be more fully understood by reference to the following Detailed Description of the Invention in conjunction with the Drawing of which.

DETAILED DESCRIPTION OF THE INVENTION

Figure 1:
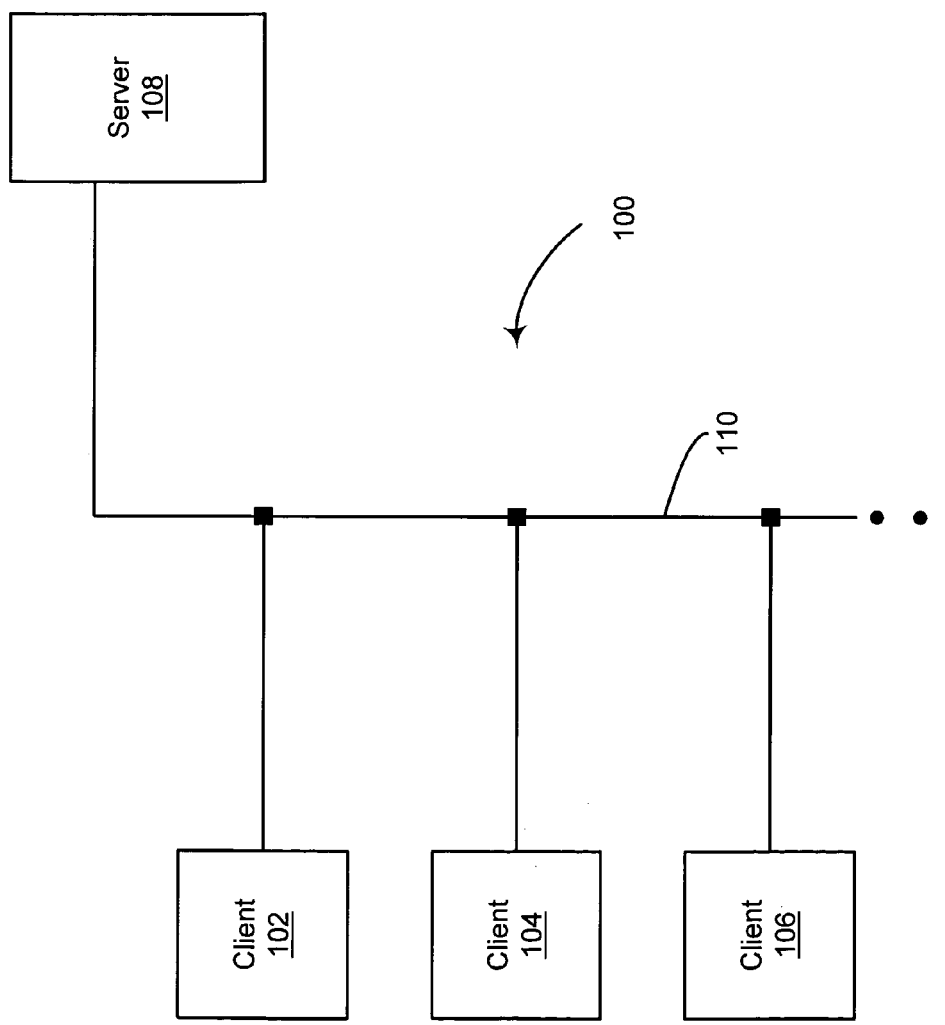
FIG. 1 is a block diagram illustrating a computer network operative in a manner according to the present invention.

FIG. 1 depicts an illustrative embodiment of a computer network 100 that is operative in a manner in accordance with the present invention. Specifically, the computer network 100 includes a plurality of client computers ("clients") such as clients 102, 104, and 106, and at least one server computer ("server") such as server 108. Further, the clients 102, 104, and 106, and the server 108 are operatively connected to a network 110, which may comprise a Local Area Network (LAN), a Wide Area Network (WAN), the Internet, or any other network suitable for linking clients and servers to allow communications therebetween.

Each of the clients 102, 104, and 106, and the server 108, includes a network adapter (not shown) for enabling communications over the network 110. In addition, each client 102, 104, and 106 includes at least one memory (not shown) such as a ROM or RAM, and at least one processor (not shown) operative for executing programs stored in the memory, including applications for processing user inputs, initiating and/or controlling connections to the network 110, and submitting requests for services/resources to the server 108.

For example, users (not shown) of the clients 102, 104, and 106 may submit requests to the server 108 for accessing selected files, directories, databases, web pages, and/or other computer services/resources. Those of ordinary skill in this art will recognize that the term "users" may refer not only to human operators, but also to processes executing on the clients 102, 104, and 106.

Figure 2:
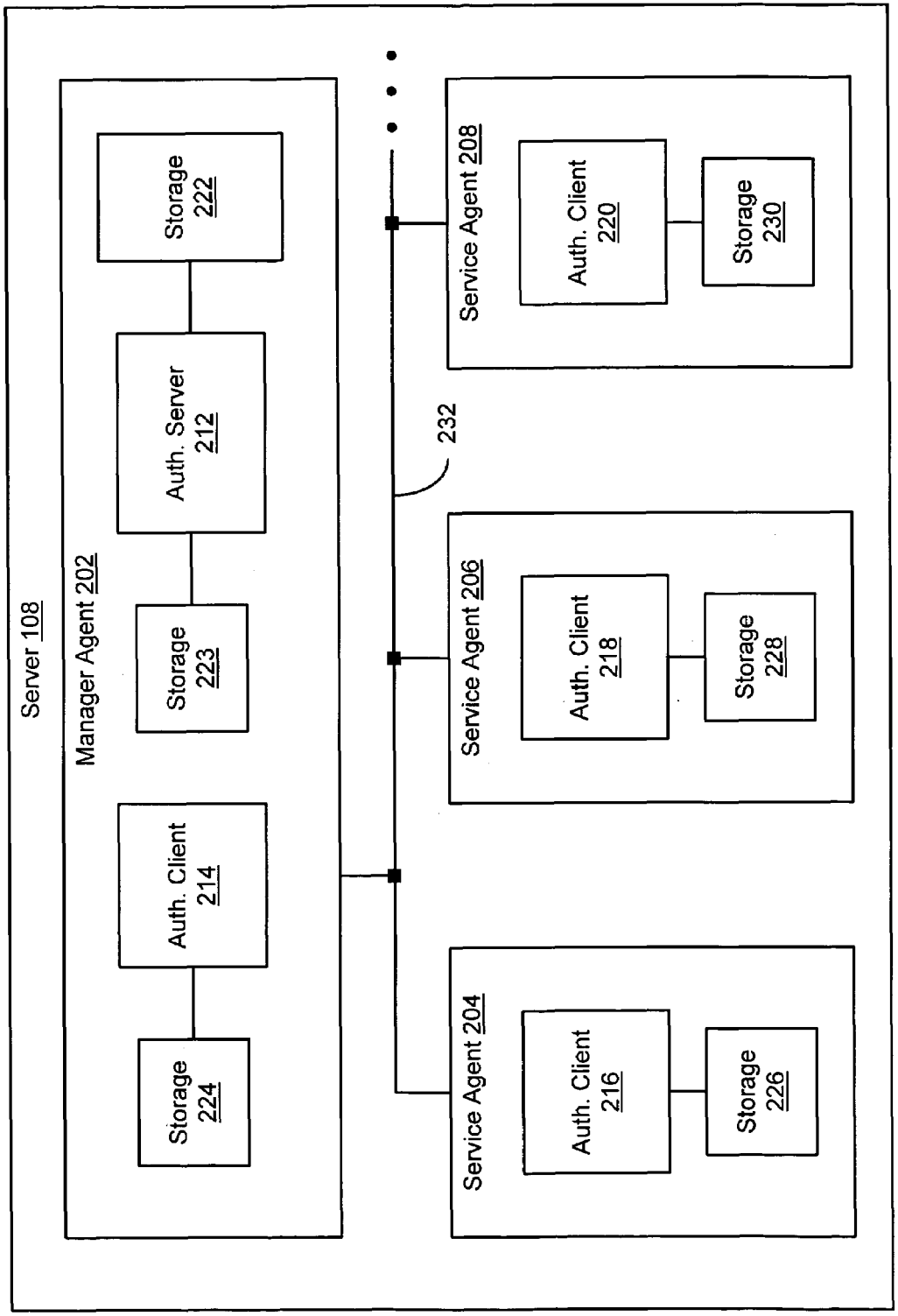
FIG. 2 is a block diagram illustrating a representative server computer connected to the computer network depicted in FIG. 1, operative in a manner according to the present invention.

FIG. 2 depicts a block diagram of an exemplary server 108 such as depicted in FIG. 1. The server 108 includes a manager agent 202 operatively connected to a plurality of service agents, such as service agents 204, 206, and 208, via a bus 232. Each agent 202, 204, 206, and 208 includes at least one memory (not shown) such as a ROM or RAM, and at least one processor (not shown) operative for executing programs stored in the memory, including applications for initiating and/or controlling connections to the network 110, processing requests for services/resources submitted by the clients 102, 104, and 106, and providing requested services/resources to the clients 102, 104, and 106.

In this illustrative embodiment, the manager agent 202 and the service agents 204, 206, and 208 are capable of executing distributed applications. For example, the users of the clients 102, 104, and 106 may submit requests to the server 108 for accessing services/resources provided by a distributed application executing on the plurality of agents 202, 204, 206, and 208. Further, each agent 202, 204, 206, and 208 executing the distributed application may provide specific services/resources to the clients 102, 104, and 106 based on the requests submitted by the users.

It should be noted that the specific services/resources provided by way of the agents 202, 204, 206, and 208 to the clients 102, 104, and 106 are dependent upon each user's level of access privileges, which is determined at the server 108 through the execution of a user authentication program. Because each agent 202, 204, 206, and 208 executing the distributed application provides specific services/resources to the users, each agent 202, 204, 206, and 208 uses at least a portion of its processing and storage resources for performing tasks related to user authentication.

Specifically, each agent 202, 204, 206, and 208 includes an authentication client operatively connected to a writable, local storage media such as a RAM. For example, the manager agent 202 includes an authentication client 214 connected to a local storage media 224, the service agent 204 includes an authentication client 216 connected to a local storage media 226, the service agent 206 includes an authentication client 218 connected to a local storage media 228, and the service agent 208 includes an authentication client 220 connected to a local storage media 230. The manager agent 202 further includes an authentication server 212 connected to a writable, local storage media 223 such as a RAM; and, a writable, main storage media 222 such as a non-volatile RAM.

In the illustrative embodiment, upon receipt of a user request for a specific service/resource provided by a distributed application executing on one or more of the agents 202, 204, 206, and 208, the authentication client for a respective agent attempts to authenticate the user by accessing user data stored in the local storage media connected thereto. If the authentication client successfully locates authentication information for the user in the local storage media, but that information does not match corresponding authentication information attached to the user request, then the authentication client transmits a message to the user informing him or her that access to the requested service/resource is denied. Alternatively, if the authentication client cannot locate authentication information for the user in the local storage media, then the authentication client submits a request to the authentication server 212 to authenticate the user.

In response to that request, the authentication server 212 attempts to authenticate the user by accessing user data stored in the local storage media 223 connected thereto. If the authentication server successfully locates authentication information for the user in the local storage media 223, but that information does not match the corresponding authentication information attached to the user request, then the authentication server transmits a message to the user informing him or her that access to the requested service/resource is denied. Alternatively, if the authentication server cannot locate authentication information for the user in the local storage media 223, then the authentication server 212 attempts to authenticate the user by accessing user data stored in the main storage media 222 connected thereto. If the authentication server 212 is incapable of successfully authenticating the user by accessing the user data stored in the main storage media 222, then the authentication server 212 may transit a message to the user informing him or her that access to the requested service/resource is denied. Alternatively, the authentication server 212 may transmit a message to the user prompting him or her to "log-in" by entering valid user authentication information. Upon receipt of that information, the authentication server 212 attempts to authenticate the user by comparing the entered user authentication information with user data stored in the main storage media 222. If the entered user authentication information matches corresponding user data stored in the main storage media 222, then access to the requested service/resource is permitted; otherwise, access is denied.

The illustrative embodiment disclosed herein will be better understood with reference to the following example, wherein a user, i.e., a human operator (not shown), of the client 102 wishes to obtain access to a specific service/resource provided by a distributed application executing on the agents 202, 204, 206, and 208 of the server 108 (see FIG. 1).

Accordingly, the client 102 transmits a message to the server 108 including a request to access the specific service/resource, which is provided by the distributed application executing on one of the agents 202, 204, 206, and 208; for example, the service agent 204. It should be understood that the manner in which the client 102 and the server 108 transmit and receive messages is conventional.

In this illustrative example, it is assumed that the above-mentioned request for services/resources transmitted by the client 102 is the first request of a session, and the first request does not include information for authenticating the user of the client 102. Accordingly, in response to that first request, the server 108 transmits a message to the client 102 that includes information about what the client 102 must do to authenticate the user.

Specifically, that message informs the client 102 that it must provide the authentication server 212 with valid authentication information for the user, e.g., a valid USERNAME/PASSWORD combination. The client 102 therefore prompts the user to enter the required USERNAME/PASSWORD combination. For example, the client 102 may prompt the user by way of a user interface (not shown), which includes a display monitor, and a keyboard and/or a screen-cursor manipulator such as a mouse.

After the user enters the requested USERNAME/PASSWORD combination via the user interface, the client 102 transmits another request for services/resources to the server 108 along with the entered USERNAME/PASSWORD. In response to that requests the authentication server 212 verifies the entered USERNAME/PASSWORD combination against user data stored in the main storage media 222 included in the manager agent 202.

In this illustrative example, the main storage media 222 includes user data corresponding to a list of "permissible" users; i.e., users that would be permitted access to the services/resources provided by the distributed application executing on the server 108 upon verification of a valid USERNAME/PASSWORD combination. For example, user data corresponding to the permissible users may be arranged in the main storage media 222 as a MAIN USER LOGIN TABLE, including the USERNAME for each permissible user and corresponding PASSWORD and ACCESS LEVEL for that user. Further, the ACCESS LEVEL may be indicated by, e.g., a numerical value within a specified range of numerical values, with each numerical value indicating a different level of access privileges for the user and optionally including the default value, ACCESS DENIED, indicating that access to the requested service/resource is denied.

If the authentication server 212 (1) locates the entered USERNAME in the MAIN USER LOGIN TABLE, and (2) determines that the entered PASSWORD matches the corresponding PASSWORD in the MAIN USER LOGIN TABLE, then the entered USERNAME/PASSWORD combination is verified and the user of the client 102 is successfully authenticated. As a result, the authentication server 212 retrieves the ACCESS LEVEL for that user from the MAIN USER LOGIN TABLE stored in the main storage media 222; stores the USERNAME, PASSWORD, and ACCESS LEVEL information in the local storage media 223; and, transmits the USERNAME, PASSWORD, and ACCESS LEVEL information to the authentication client requesting authentication of the user (e.g., the authentication client 216) for storage in the local storage media operatively connected thereto (e.g., the local storage media 226).

In this illustrative example, each local storage media 223, 224, 226, 228, and 230 includes user data related to a list of "active" users; i.e., users that have been successfully verified against the user data stored in the main storage media 222. For example, the user data corresponding to the active users may be arranged in each local storage media 223, 224, 226, 228, and 230 as a LOCAL USER LOGIN TABLE, including the USERNAME for each active user and the corresponding PASSWORD and ACCESS LEVEL for that user.

The authentication server 212 also retrieves a SYSTEM TIMEOUT VALUE from the main storage media 222 along with the ACCESS LEVEL information, and transmits the SYSTEM TIMEOUT VALUE with the USERNAME, PASSWORD, and ACCESS LEVEL information to the authentication client requesting authentication of the user (e.g., the authentication client 216) for storage in its respective LOCAL USER LOGIN TABLE as a LOGIN TIMEOUT VALUE for the authenticated user. The LOGIN TIMEOUT VALUE indicates the maximum allowable amount of time between successive user "activities", which include user requests submitted from the client 102 for services/resources provided by the distributed application executing on the server 108. For example, if the time between successive user activities exceeds the LOGIN TIMEOUT VALUE for that user, then the user must be re-authenticated by the authentication server 212 before being permitted access to the requested services/resources.

In this illustrative example, the user may re-configure his or her corresponding LOGIN TIMEOUT VALUE via a user interface of the server 108. For example, the SYSTEM TIMEOUT VALUE may be equal to 30 minutes; and, the user may re-configure the corresponding LOGIN TIMEOUT VALUE to equal any integral value ranging from 0 to 30 minutes, wherein a LOGIN TIMEOUT VALUE of 0 minutes indicates that the user is not subject to any time constraints between successive user activities and is therefore logged-in indefinitely.

If the user re-configures his or her corresponding LOGIN TIMEOUT VALUE, then the authentication server 212 transmits the new LOGIN TIMEOUT VALUE to each authentication client 214, 216, 218, and 220. If the user is active on any of the agents 202, 204, 206, and 208, then the authentication client for each of those agents replaces the user's LOGIN TIMEOUT VALUE stored in its respective LOCAL USER LOGIN TABLE with the new value.

In a preferred embodiment, the LOGIN TIMEOUT VALUES for active users are arranged in the local storage media 223 as a SESSION TIMEOUT TABLE, including the USERNAME for each active user and the corresponding LOGIN TIMEOUT VALUE for that user. Specifically, the SESSION TIMEOUT TABLE tracks LOGIN TIMEOUT VALUES for all active users of clients requesting services/resources provided by the distributed application executing on the agents 202, 204, 206, and 208 of the server 108.

After the authentication server 212 transmits the USERNAME, PASSWORD, ACCESS LEVEL, and SYSTEM TIMEOUT VALUE for the authenticated user to the authentication clients 214, 216, 218, and 220 for storage in the LOCAL USER LOGIN TABLES of the local storage media 224, 226, 228, and 230, respectively, the authentication server 212 provides the authenticated user's ACCESS LEVEL to the distributed application, which provides the requested service/resource to the user of the client 102 according to the ACCESS LEVEL of that user.

It should be noted that if the authentication server 212 fails to locate the entered USERNAME in the MAIN USER LOGIN TABLE, then that USERNAME does not correspond to a permissible user, and that user therefore cannot be successfully authenticated. As a result, the authentication server 212 transmits a message to the client 102 indicating that access to the requested service/resources is denied.

The illustrative embodiment disclosed herein can be used with distributed applications that require "per-form" authentication. "Per-form" authentication pertains to an authentication technique that requires verification of user authentication information for each form or document requested by the user. Because such user authentication information is stored locally in each of the agents 202, 204, 206, and 208, verification of user authentication information per-form may be achieved by locating that information in the LOCAL USER LOGIN TABLES of the local storage media 224, 226, 228, and 230, instead of submitting a request to the authentication server 212 to authenticate the user by locating that information in either the LOCAL USER LOGIN TABLE of the local storage media 223 or the MAIN USER LOGIN TABLE of the main storage media 222.

In this illustrative example, the user submits a second request for services/resources provided by the distributed application executing on the service agent 204. Because that second request is submitted after the authentication server 212 has already successfully authenticated the user, the client 102 automatically attaches the user's authentication information, i.e., the valid USERNAME/PASSWORD combination, to the request.

In response to that request, the authentication client 216 included in the service agent 204 attempts to authenticate the user by verifying the USERNAME/PASSWORD combination attached to the request against the user data stored in the local storage media 226 included in the service agent 204. If the authentication client 216 (1) locates the attached USERNAME in the LOCAL USER LOGIN TABLE of the local storage media 226, and (2) determines that the attached PASSWORD matches the corresponding PASSWORD in the LOCAL USER LOGIN TABLE, then the attached USERNAME/PASSWORD combination is verified and the user is successfully authenticated. Accordingly, the authentication client 216 provides the authenticated user's ACCESS LEVEL to the distributed application, which provides the requested service/resource to the user according to the ACCESS LEVEL of that user.

If the authentication client 216 determines that the attached PASSWORD does not match the corresponding PASSWORD in the LOCAL USER LOGIN TABLE of the local storage media 226, then the authentication client 216 transmits a message to the user informing him or her that access to the requested service/resource is denied. Alternatively, if the authentication client 216 cannot locate the attached USERNAME in the LOCAL USER LOGIN TABLE, then the authentication client 216 submits a request to the authentication server 212 to authenticate the user of the client 102.

In response to that request, the authentication server 212 attempts to authenticate the user by verifying the USERNAME/PASSWORD combination attached to the request against the user data stored in the local storage media 223 included in the manager agent 202. If the authentication server 212 (1) locates the attached USERNAME in the LOCAL USER LOGIN TABLE of the local storage media 223, and (2) determines that the attached PASSWORD matches the corresponding PASSWORD in the LOCAL USER LOGIN TABLE, then the attached USERNAME/PASSWORD combination is verified and the user of the client 102 is successfully authenticated. Accordingly, the authentication server 212 provides the authenticated user's ACCESS LEVEL to the distributed application, which provides the requested service/resource to the user according to the ACCESS LEVEL of that user.

If the authentication server 212 determines that the attached PASSWORD does not match the corresponding PASSWORD in the LOCAL USER LOGIN TABLE of the local storage media 223, then the authentication server 212 transmits a message to the user informing him or her that access to the requested service/resource is denied. Alternatively, if the authentication server 212 cannot locate the attached USERNAME in the LOCAL USER LOGIN TABLE, then the authentication server 212 attempts to authenticate the user by verifying the USERNAME/PASSWORD combination against the user data stored in the main storage media 222 included in the manager agent 202. If the authentication server 212 (1) locates the attached USERNAME in the MAIN USER LOGIN TABLE of the main storage media 222, and (2) determines that the attached PASSWORD matches the corresponding PASSWORD in the MAIN USER LOGIN TABLE, then the attached USERNAME/PASSWORD combination is verified and the user of the client 102 is successfully authenticated. Accordingly, the authentication server 212 provides the authenticated user's ACCESS LEVEL to the distributed application, which provides the requested service/resource to the user according to the ACCESS LEVEL of that user.

If the authentication server 212 either cannot locate the attached USERNAME in the MAIN USER LOGIN TABLE of the main storage media 222, or determines that the attached PASSWORD does not match the corresponding PASSWORD in the MAIN USER LOGIN TABLE, then the authentication server 212 cannot successfully authenticate that user. Accordingly, the authentication server 212 transmits a message to the client 102 indicating that access to the requested service/resources is denied, thereby terminating the current session between the client 102 and the server 108.

As mentioned above, the SESSION TIMEOUT TABLE included in the local storage media 223 tracks LOGIN TIMEOUT VALUES for all active users of clients submitting requests for services/resources provided by the distributed application executing on the server 108. Further, each LOGIN TIMEOUT VALUE indicates the maximum allowable amount of time between successive user activities; i.e., the maximum allowable "idle" time for that user. Accordingly, the authentication server 212 includes a timer (not shown) for determining whether maximum allowable idle times corresponding to users listed in the SESSION TIMEOUT TABLE have been exceeded.

Similarly, each authentication client 214, 216, 218, and 220 includes a timer (not shown) for determining whether the maximum allowable idle time, as indicated by the LOGIN TIMEOUT VALUES stored in the respective local storage media 224, 226, 228, and 230, has been exceeded for each active user listed in the respective LOCAL USER LOGIN TABLES.

If the authentication server 212 determines that the maximum allowable idle time, as indicated by the user's LOGIN TIMEOUT VALUE stored in the SESSION TIMEOUT TABLE, has been exceeded, then that user is no longer considered an active user and the authentication server 212 re-sets the ACCESS LEVEL in the SESSION TIMEOUT TABLE for that previously active, authenticated user to the default value, ACCESS DENIED.

Accordingly, if the authentication server 212 subsequently attempts to authenticate the user by verifying the user authentication information against the user data listed in the LOCAL USER LOGIN TABLE of the local storage media 223 or the MAIN USER LOGIN TABLE of the main storage media 222, and determines from the SESSION TIMEOUT TABLE that the ACCESS LEVEL for that user is set to the default value, then the authentication server 212 removes the user authentication data for that user from the LOCAL USER LOGIN TABLE and the SESSION TIMEOUT TABLE of the local storage media 223 to terminate the current session, and the server 108 transmits a message to the client prompting the user to log-in by entering valid user authentication information, thereby starting a new session. It should be noted that the SESSION TIMEOUT TABLE may alternatively be implemented as fields in the LOCAL USER LOGIN TABLE of the local storage media 223.

If any authentication client 214, 216, 218, or 220 determines that the maximum allowable idle time, as indicated by the user's LOGIN TIMEOUT VALUE stored in the LOCAL USER LOGIN TABLES of the local storage media 224, 226, 228, and 230, has been exceeded, then the authentication client 214, 216, 218, or 220 immediately removes the authentication information for that user from its respective LOCAL USER LOGIN TABLE. Accordingly, upon receiving a subsequent request for services/resources from the user, the authentication client 214, 216, 218, or 220 submits a request to the authentication server 212 to authenticate the user.

Whenever any authentication client 214, 216, 218, and 220 processes a user activity, then that authentication client re-starts its determination of whether the maximum allowable idle time, as indicated by that user's LOGIN TIMEOUT VALUE, has been exceeded. Further, the authentication client transmits a message to the authentication server 212 notifying the authentication server 212 that the user activity has occurred. As a result, the authentication server 212 re-starts its determination of whether the maximum allowable idle time for that user has been exceeded. In this way, "time-out" determinations performed by the authentication clients 214, 216, 218, and 220 are synchronized with the time-out determinations performed by the authentication server 212.

In a preferred embodiment, each authentication client 214, 216, 218, and 220 transmits one notification message to the authentication server 212 for each user that is active during the preceding 60 seconds. Further, in order to avoid potential race conditions between the time-out determinations performed by the authentication server 212 and the authentication clients 214, 216, 218, and 220, the authentication clients 214, 216, 218, and 220 adjust the LOGIN TIMEOUT VALUES listed in the LOCAL USER LOGIN TABLES to be approximately 1 minute less than the corresponding LOGIN TIMEOUT VALUES listed in the SESSION TIMEOUT TABLE. As a result, users' maximum allowable idle times will be exceeded at the authentication clients 214, 216, 218, and 220 about 1 minute before they are exceeded at the authentication server 212, thereby ensuring that all final time-out determinations are made by the authentication server 212 using the SESSION TIMEOUT TABLE. It should be understood that the 1 minute time may be varied recognizing the objective that race conditions be eliminated.

Figure 3:
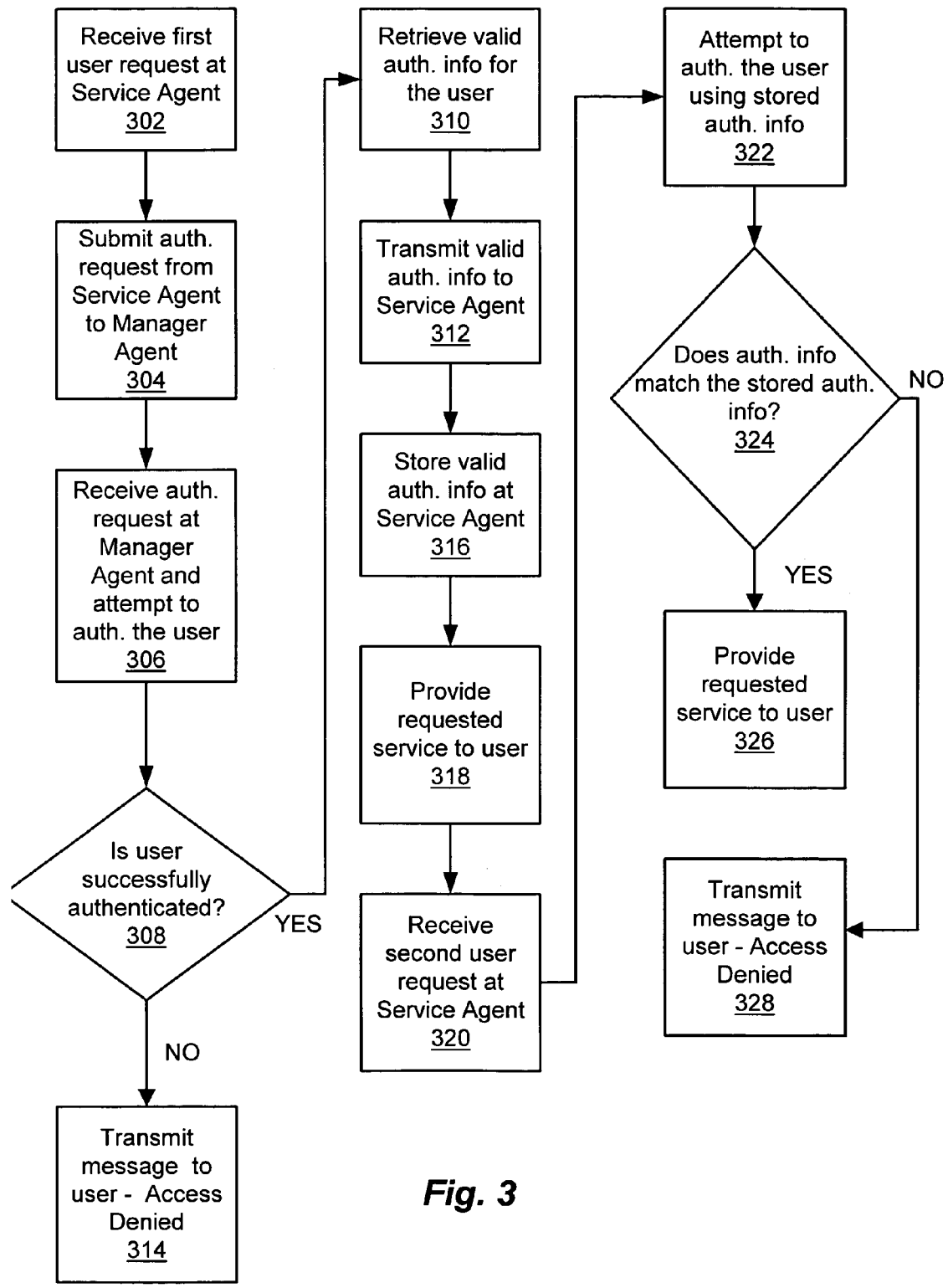
FIG. 3 is a flow diagram illustrating a method of the representative server computer depicted in FIG. 2 for authenticating users, operative in a manner according to the present invention.

A method of authenticating a user submitting a service request from a client to a server executing a distributed application on a plurality of data processing agents is illustrated by reference to FIG. 3. As depicted in step 302, a first user request is received at a service agent for a service/resource provided by the distributed application executing on the service agent. Next, the service agent submits, as depicted in step 304, a request to the manager agent to authenticate the user. As depicted in step 306, the manager agent receives the authentication request and attempts to authenticate the user. Next, a decision is made, as depicted in step 308, as to whether the user is successfully authenticated. If so, then the manager agent retrieves, as depicted in step 310, valid authentication information for that user and transmits, as depicted in step 312, that information to the service agent. Otherwise, the server transmits, as depicted in step 314, a message to the client indicating that access to the requested service/resource is denied. As depicted in step 316, the service agent receives and stores the valid authentication information. Next, the distributed application executing on the service agent provides, as depicted in step 318, the requested service/resource to the user. As depicted in step 320, a second user request is received at the same service agent. Next, the service agent attempts, as depicted in step 322, to authenticate the user using the stored user authentication information. As depicted in step 324, a decision is made as to whether authentication information attached to the second user request matches the stored user authentication information. If so, then the distributed application executing on the service agent provides, as depicted in step 326, the requested service/resource to the user. Otherwise, the server transmits, as depicted in step 328, a message to the client indicating that access to the requested service/resource is denied.

Figure 4:
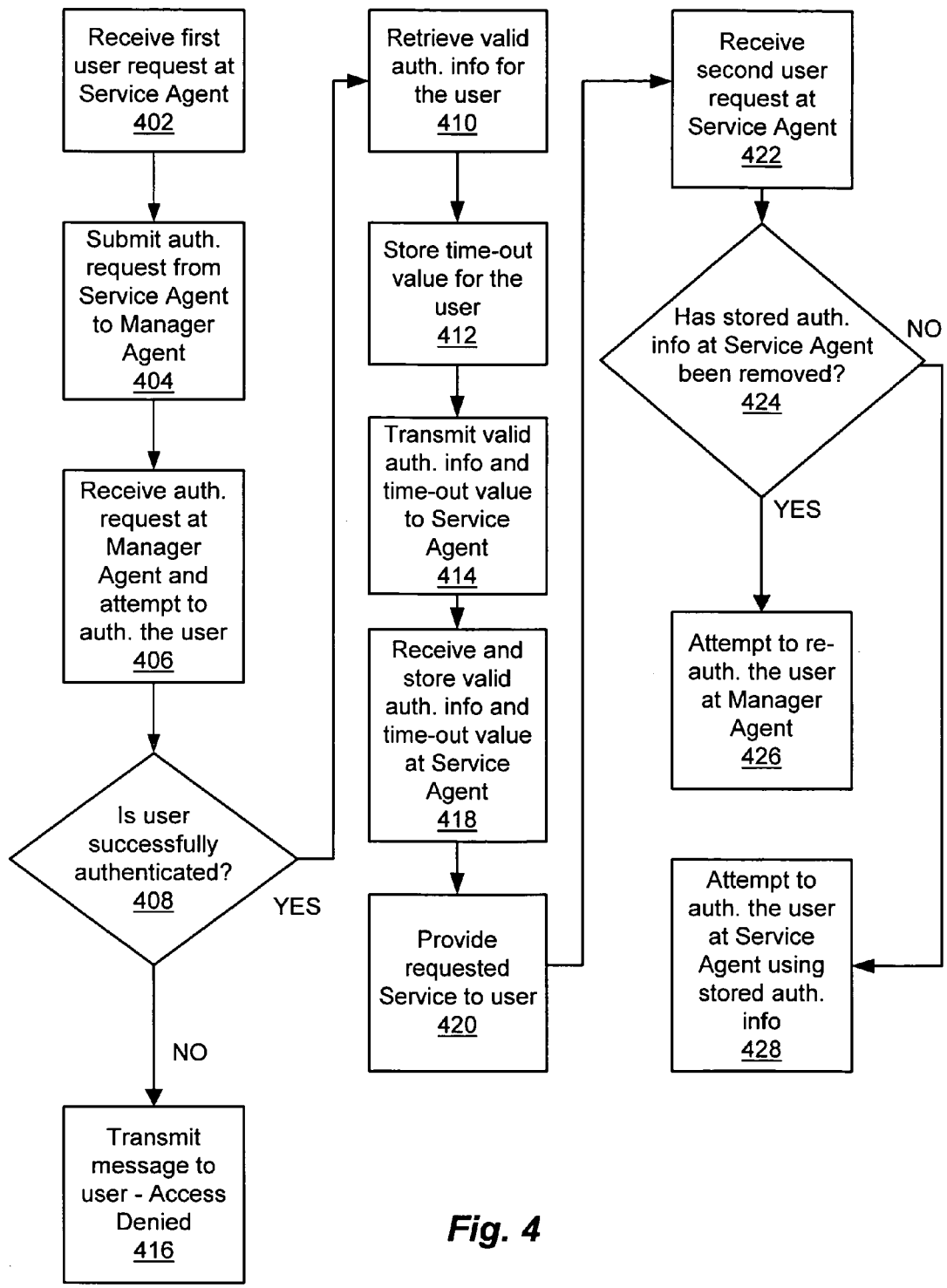
FIG. 4 is a flow diagram illustrating a method of the representative server computer depicted in FIG. 2 for restricting the amount of time that a valid user can remain idle, operative in a manner according to the present invention.

A method of restricting the amount of time that a user submitting requests from a client can remain idle before requiring that user to be re-authenticated is illustrated by reference to FIG. 4. As depicted in step 402, a first user request is received at a service agent for a service/resource provided by the distributed application executing on the service agent. Next, the service agent submits, as depicted in step 404, a request to a manager agent to authenticate the user. As depicted in step 406, the manager agent receives the authentication request and attempts to authenticate the user. Next, a decision is made, as depicted in step 408, as to whether the user is successfully authenticated. If so, then the manager agent retrieves, as depicted in step 410, valid user authentication information; stores, as depicted in step 412, a predetermined time-out value for that user; and transmits, as depicted in step 414, the authentication information and the time-out value to the service agent. Otherwise, the server transmits, as depicted in step 416, a message to the client indicating that access to the requested service/resource is denied. As depicted in step 418, the service agent receives and stores the valid user authentication information and the time-out value. Next, the distributed application executing on the service agent provides, as depicted in step 420, the requested service/resource to the user. As depicted in step 422, a second user request is received at the same service agent. Next, a decision is made, as depicted in step 424, as to whether the authentication information for that user has been removed from the service agent's storage media because the corresponding time-out value has been exceeded. If so, then the user is required, as depicted in step 426, to be re-authenticated by the manager agent. Otherwise, the service agent authenticates, as depicted in step 428, the user using the stored user authentication information.

Having described one illustrative embodiment, other alternative embodiments or variations may be made. For example, it was described that a client submits user requests to a server by way of a network for accessing services/resources provided by a distributed application executing on a plurality of agents included in that same server. However, the plurality of agents executing the distributed application may alternatively be included in respective servers operatively connected to the network. In this alternative embodiment, one server may include a manager agent, and the remaining servers may include respective service agents. Further, the server including the manager agent may further include storage media for storing the MAIN USER LOGIN TABLE and the SESSION TIMEOUT TABLE, and the servers including the respective service agents may further include storage media for storing LOCAL USER LOGIN TABLES. In this way, the disclosed systems and techniques for authenticating users can be implemented in a fully distributed computing environment.

Those of ordinary skill in the art will appreciate that computer programs for performing the presently described functions can be delivered to the server 108 in many forms including, but not limited to: (a) information permanently stored on non-writable storage media (e.g., read-only memory devices within a computer such as ROM or CD-ROM disks readable by a computer I/O attachment; (b) information alterably stored on writable storage media (e.g., floppy disks, tapes, read/write optical media and hard drives); or, (c) information conveyed to a computer through a communication media, for example, using base-band signaling or broadband signaling techniques, such as over computer or telephone networks via a modem.

In addition, while in this illustrative embodiment the functions are illustrated as being software-driven and executable out of memories by processors in the server 108, the presently described functions may alternatively be embodied in part or in whole using hardware components such as custom or semi-custom integrated circuits including Application Specific Integrated Circuits (ASICs), Programmable Logic Arrays (PLAs), state machines, controllers or other hardware components or devices, or a combination of hardware components and software.

Those of ordinary skill in the art should further appreciate that variations to and modification of the above-described systems and techniques for authenticating users submitting requests from clients to servers may be made without departing from the inventive concepts disclosed herein. Accordingly, the present invention should be viewed as limited solely by the scope and spirit of the appended claims.

What is claimed is:

1. A method of authenticating a user of a client computer at a server computer executing a distributed application on a plurality of first data processing agents, comprising the steps of:
   receiving a first service request from the user at one of the plurality of first data processing agents;
   submitting an authentication request from the one of the plurality of first data processing agents to a second data processing agent to authenticate the user;
   authenticating the user at the second data processing agent;
   if the user is successfully authenticated:
      storing a first timeout value indicative of a predetermined first time period on the second data processing agent; and
      sending authentication information that the one of the plurality of first data processing agents can use to subsequently re-authenticate the user without submitting subsequent authentication request to the second data processing agent;
   determining whether the predetermined first time period is exceeded;
   if the predetermined first time period is exceeded without receiving a second service request from the user, requiring the user to log into the second data processing agent upon receipt of the second service request; and
   if the second service request is received from the user at another of the plurality of first data processing agents before the first time period is exceeded, restarting the first timeout value.

2. The method of claim 1, further including the steps of receiving the second service request from the user, and determining whether the first predetermined time period is exceeded.

3. The method of claim 1, further including the steps of receiving the second service request from the user at the one of the plurality of first data processing agents, transmitting a message from the one of the plurality of first data processing agents to the second data processing agent including a notification that the second service request is received, receiving the notification at the second data processing agent, and determining whether the predetermined time period is exceeded.

4. The method of claim 1, further comprising the steps of:
   receiving the second service request from the user at the other first data processing agent; and
   transmitting a message from the other first data processing agent to the second data processing agent indicating receipt of the second service request from the user; and
   wherein the step of resetting the timeout period is responsive to receipt of the message indicating receipt of the second service request from the user.

5. The method of claim 1, further comprising the steps of:
if the user is successfully authenticated, storing a second timeout value indicative of a second predetermined time period on the plurality of first data processing agents; and
if the at least one of the plurality of first data processing agents receives the second service request before the second timeout period is exceeded:
restarting the second timeout period stored on the one of the plurality of first data processing agents that received the second service request; and
providing the requested service to the user without requiring the user to be authenticated at the second data processing agent upon receipt of the second services request.

6. The method of claim 5, wherein the second predetermined time period is less than the first predetermined time period.

7. The method of claim 5, further comprising the step of inputting the second timeout value from the user.

8. The method of claim 1, further comprising the step of inputting the first timeout value from the user.

9. A system for authenticating a user of a client computer at a server computer executing a distributed application on a plurality of data processing agents, the system comprising:
a server including a plurality of first data processing agents for receiving service requests from the user and a second data processing agent for authenticating the user,
wherein each of the plurality of first data processing agents is configured to submit an authentication request to the second data processing agent to authenticate the user,
wherein the second data processing agent is configured to:
receive the authentication request from the submitting first data processing agent;
attempt to authenticate the user; and
if the user is successfully authenticated, store a first timeout value indicative of a first predetermined time period, and send to the submitting data processing agent authentication information that the submitting first data processing agent can use to subsequently re-authenticate the user without submitting a subsequent authentication request to the second data processing agent; and
determine whether the first predetermined time period is exceeded;
wherein each of the plurality of first data processing agents is further configured to notify the second data processing agent if a second service request is received from the user, and the second data processing agent is configured to restart the first timeout value in response to receiving the notification after receiving a previous notification, relative to the user, from another one of the first data processing agents,
wherein each of the plurality of first data processing agents is further configured to require the user to log into the second data processing agent upon receipt of a second service request if the first predetermined time period is exceeded before the second services request is received.

10. The system of claim 9, wherein at least one of the plurality of first data processing agents is configured to:
store a second timeout value indicative of a second predetermined time period if the user is successfully authenticated; and
if the least one of the plurality of first data processing agents receives the second service request before the second predetermined timeout period is exceeded:
restart the second timeout value; and
provide the requested service to the user without requiring the user to be authenticated at the second data processing agent upon receipt of the second service request.

11. The system of claim 10, wherein the second predetermined time period is less than the first predetermined time period.

12. The system of claim 11, wherein at least one of the plurality of first data processing agents is configured to receive the second timeout value from the user.

13. The system of claim 11, wherein the second data processing agent is configured to receive the second timeout value from the user.

* * * * *